United States Patent [19]

Itoyama et al.

[11] Patent Number: 5,627,459
[45] Date of Patent: May 6, 1997

[54] DC/DC CONVERTER

[75] Inventors: Masami Itoyama; Shigeru Honda, both of Kawasaki; Masaharu Kagawa, Kurashiki, all of Japan

[73] Assignee: Fujitsu Limited, Kawasaki, Japan

[21] Appl. No.: 603,956

[22] Filed: Feb. 16, 1996

Related U.S. Application Data

[63] Continuation of Ser. No. 214,588, Mar. 18, 1994, abandoned.

[30] Foreign Application Priority Data

Apr. 19, 1993 [JP] Japan ................. 5-091232

[51] Int. Cl.$^6$ ............................... G05F 1/40
[52] U.S. Cl. .............. 323/283; 323/284; 323/288; 323/290
[58] Field of Search ................... 323/282, 283, 323/288, 351, 290

[56] References Cited

U.S. PATENT DOCUMENTS

| | | | |
|---|---|---|---|
| 4,092,712 | 5/1978 | Harrigill, Jr. et al. | 363/60 |
| 4,947,102 | 8/1990 | Ekstrand et al. | 323/293 |
| 5,045,771 | 9/1991 | Kislovski | 323/282 |
| 5,278,490 | 1/1994 | Smedley | 323/284 |

FOREIGN PATENT DOCUMENTS 4-150765  5/1992  Japan.

OTHER PUBLICATIONS

English language Abstract of JP 4-150765.

*Primary Examiner*—Peter S. Wong
*Assistant Examiner*—Shawn Riley
*Attorney, Agent, or Firm*—Staas & Halsey

[57] ABSTRACT

A DC/DC converter includes a control unit for outputting a control signal on the basis of a voltage difference between a DC output voltage and a reference voltage; a switching element which is connected to a line of the DC input voltage, and which becomes ON-state or OFF-state in accordance with the control signal; and a minimum ON-state duration setting unit, e.g., a monostable multivibrator, which defines the minimum ON-state duration of the switching element, when a necessary output electric power is low. Preferably, the converter includes a charge-pumping circuit having two diodes and two capacitors, so as to obtain from one capacitor a driving voltage source for driving an N-channel type field-effect transistor as the switching element.

18 Claims, 10 Drawing Sheets

Fig.10
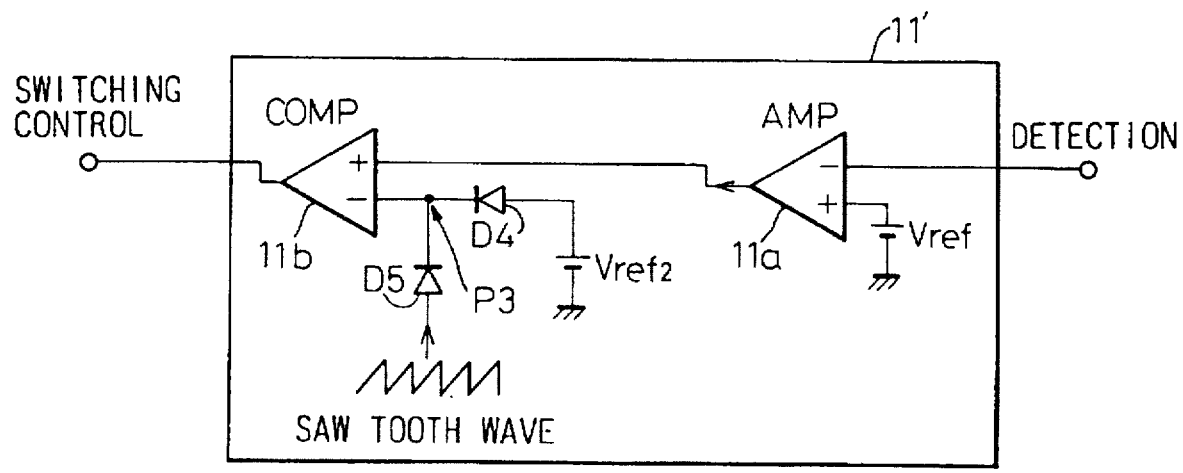
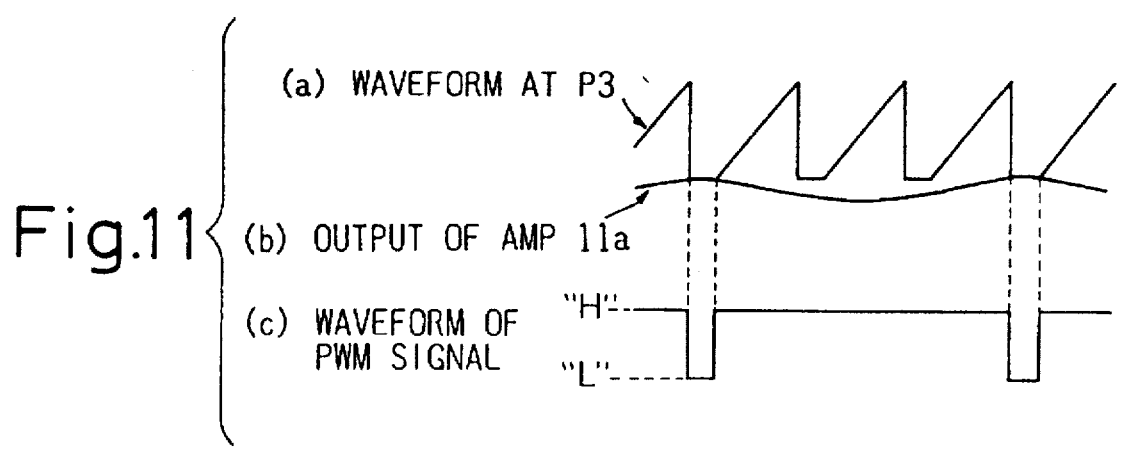
Fig.11
(a) WAVEFORM AT P3
(b) OUTPUT OF AMP 11a
(c) WAVEFORM OF PWM SIGNAL

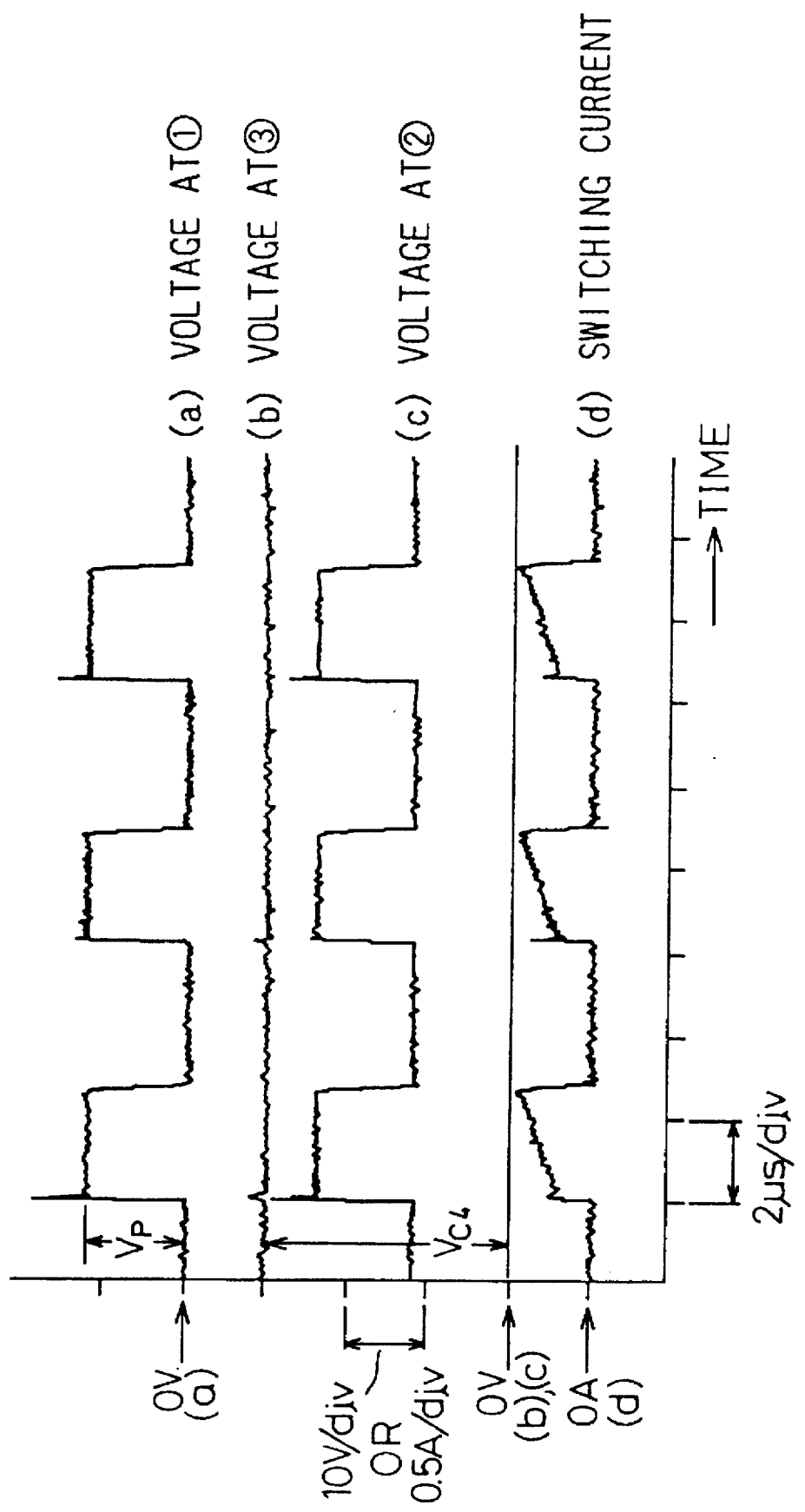

DC/DC CONVERTER

This is a continuation of application Ser. No. 08/214,588, filed Mar. 18, 1994, now abandoned.

BACKGROUND OF THE INVENTION

1. Field of the Invention

The present invention relates to a DC/DC (DC is an abbreviation for "Direct Current") converter which converts a given DC input voltage to a desired DC output voltage for supplying an electric load, by means of a switching control of an switching element, e.g., by executing a pulse width modulation of such a switching element.

More specifically, the present invention relates to a DC/DC converter, which enables higher efficiency for a voltage conversion to be attained, even in the case where an electric load connected to an output terminal of the DC/DC converter is light and requires only a small electric current, with a relatively simple circuit.

Further, the present invention relates to a DC/DC converter of step-down voltage type, in which a field-effect (FET) transistor having a relatively low resistor value in an ON-state can be used as the switching element, so that a relatively high efficiency for a voltage conversion and a relatively small whole size can be ensured.

2. Description of the Related Art

Generally, a DC/DC converter utilizing a switching operation, e.g., by means of a PWM (Pulse-Width Modulation) control of a switching element such as a transistor has a relative small size, and therefore can be constituted by an IC (integrated circuit). Such an IC has usually a relatively wide frequency range in regard to operational oscillation frequencies for the PWM control.

Typically, the IC can oscillate even with an oscillation frequency as high as 500 kHz. By using such a high oscillation frequency, a choke coil, a capacitor, and the like, utilized as main circuit components of a smoothing circuit in the DC/DC converter, can be smaller in their size. Therefore, the whole size of the DC/DC converter, which is constituted by an IC oscillating with a higher oscillation frequency, is likely to be remarkably small.

Here, to enable circuit configurations of DC/DC converters of the prior art to be easily understood, some examples of conventional DC/DC converters will be described with reference to the related drawings of FIGS. 1 to 4.

FIG. 1 is a circuit diagram showing a first example of a DC/DC converter of the prior art.

In FIG. 1, C10 and C20 denote capacitors; S10 denotes a switching element, e.g., a transistor; D10 denotes a diode; and L10 denotes an inductance coil, e.g., a choke coil. Further, 110 denotes a control unit which output a PWM signal for controlling an ON-OFF operation of the switching element S10 (i.e., for switching control), on the basis of detection result of an output DC voltage from the DC/DC converter.

In such a construction, when a given DC input voltage is supplied to an input terminal of the DC/DC converter, the DC input voltage can be converted to a desired DC output voltage for sending from an input terminal of the DC/DC converter to an electric load, by a control function of the control unit 110.

FIG. 2 is a circuit diagram showing a circuit configuration of a control unit in FIG. 1.

In FIG. 2, a control unit 110 includes an amplifier(AMP) 112 which is usually referred to as an error amplifier, and a comparator(COMP) 113 which is connected to an output of the amplifier 112.

More specifically, the amplifier 112 is operative to compare the DC output voltage with a predetermined reference voltage Vref and to amplify the voltage difference between the DC output voltage and the predetermined reference voltage Vref. The comparator 113 is operative to compare the voltage difference output from the amplifier 112 with a voltage of a predetermined saw tooth wave.

Further, the operation of the DC/DC converter of the prior art shown in FIGS. 1 and 2 will be described.

In the control unit 110, as shown in FIG. 2, the DC output voltage from the DC/DC converter is compared with the reference voltage Vref by means of the amplifier 112. Further, a signal, which corresponds to the voltage difference between the DC output voltage and the predetermined reference voltage Vref, is supplied to the comparator 113. Subsequently, the comparator 113 outputs a PWM signal, in accordance with a comparison result that is obtained by comparing the voltage difference output from the amplifier 112 with a voltage of a predetermined saw tooth wave. The switching element S10 executes an ON-OFF operation, in accordance with the PWM signal which is output from the comparator 113.

In this case, the capacitor C10 shown in FIG. 1 is charged in advance by means of a DC input voltage which is supplied to an input of the DC/DC converter. When the switching element S10 becomes ON-state by the PWM signal which is output from the control unit 110, a DC input voltage of the DC/DC converter is supplied to an inductance coil L10, through the switching element S10. Therefore, an electric energy is accumulated in this inductance coil L10. Also, another capacitor C20 is charged by means of the DC input voltage which passes through the inductance coil L10.

On the other hand, when the switching element S10 becomes OFF-state by the above-mentioned PWM signal, an electric energy, which has been accumulated during ON-state duration of the switching element S10, is released, through the capacitor C20 and the diode D10. Consequently, the capacitor C20 is further charged by means of the thus released electric energy.

In the case where a voltage between both terminals of the capacitor C20 become higher than the predetermined reference voltage Vref in the control unit 110, a pulse width of each pulse of the PWM signals decreases. Therefore, ON-state duration of the switching element S10, corresponding to the time period during which the switching element becomes ON-state, is shortened. On the other hand, in the case where a voltage between both terminals of the capacitor C20 become lower than the reference voltage Vref in the control unit 110, a pulse width of each pulse of the PWM signals increases. Therefore, ON-state duration of the switching element S10 is lengthened. In both cases, an DC output voltage of the DC/DC converter is controlled by the control unit 110 so that a voltage value of the DC output voltage becomes equal to a voltage value of the reference voltage Vref.

FIG. 3 is a circuit diagram showing a second example of a DC/DC converter of the prior art. Hereinafter, any component that is the same as that mentioned before will be referred to using the same reference number.

In FIG. 3, a DC/DC converter of step-down voltage type(for example, a voltage value of a DC input voltage is 6 V to 18 V, while a voltage value of a DC output voltage is 5 V) is illustrated, in which a P-channel type field-effect transistor Q10 is used as a circuit element corresponding to the switching element S10 shown in FIG. 1. Further, in FIG. 3, a Schottky barrier diode SBD is used as a circuit element corresponding to the diode D10 shown in FIG. 1.

Further, in the figure, a switch circuit 120, which is mainly constituted by a bipolar transistor Q20, is provided at the output side of the DC/DC converter. The switch circuit 120 includes resistors R20, R30 for adequately adjusting operating characteristics of the bipolar transistor Q20. Further, the switch circuit 120 includes another bipolar transistor Q30 for supplying an adequate electric current to the bipolar transistor Q20; and other resistors R40, R50 for determining an operating point of the bipolar transistor Q30. The switch circuit 120 is necessary to make a voltage level of the DC output voltage stable even in a DC/DC converter of step-down voltage type.

FIG. 4 is a circuit diagram showing a third example of a DC/DC converter of the prior art.

In this case, an N-channel type field-effect transistor Q11 is provided, in place of a P-channel type field-effect transistor Q10 in a DC/DC converter of step-down voltage type shown in FIG. 3. Also, another N-channel type field-effect transistor Q21 is provided, in place of a bipolar transistor Q20 in the switch circuit 120. Each of these N-channel type field-effect transistors usually has a relatively low resistor value in an ON-state, and therefore a higher efficiency for a DC voltage conversion can be attained.

However, in this example, it should be noted that it is necessary for a DC/DC converter circuit 130 of step-up voltage type to be additionally provided, in order to obtain a driving voltage source for driving the N-channel type field-effect transistor Q21 in the switch unit 120. The DC/DC converter circuit 130 has a control switching unit 132 including a switching element and a control unit, an inductance coil L30, and a capacitor C30, similar to a circuit configuration of FIG. 1.

As described above, in the DC/DC converter shown in each of FIGS. 1 and 2, a switching operation, i.e., an ON-OFF operation of a switching element is executed by utilizing a PWM signal which is obtained by comparing a voltage output from an error amplifier with a voltage of a predetermined saw tooth wave, as a control signal. Here, in the case where an electric load connected to an output terminal of the DC/DC converter is changed, only a duty factor of each pulse in a PWM signal is changed, and a switching frequency of the PWM signal remains constant.

Further, in the above-mentioned DC/DC converter, as an oscillation frequency of the PWM signal becomes higher, a power loss which is mainly generated at the timing of switching of the switching element remarkably increases, and therefore an efficiency for a DC voltage conversion is deteriorated.

Especially, even in the case where an electric load connected to an output terminal of the DC/DC converter is light and requires only a small current, the PWM signal oscillates with an approximately constant oscillation frequency.

Here, it is assumed that a power loss in one period of switching of the switching element in the PWM signal is constant, independent of characteristics of an electric load. Further, it is assumed that an electric power of a desired DC output voltage is supplied from a battery to an apparatus having this electric load. In the case where an electric power required for an electric load ranges from several milliwatts (mW) to several thousand milliwatts, when an electric power required for an electric load is in a middle range and a higher range, a relatively high efficiency for a DC voltage conversion is obtained.

However, when such an electric power is in a lower range (for example, from several milliwatts to several tens of milliwatts), an efficiency for a DC voltage conversion is remarkably deteriorated. Especially, when an electric power as low as several milliwatts continues to be consumed for a relatively long time, the battery is likely to be rapidly exhausted.

Therefore, the DC/DC converter shown in each of FIGS. 1 and 2 has a disadvantage that the time for which a battery, etc., can be used is likely to be shortened, in the case where an electric power supplied to an electric load is relatively low.

Generally, in a DC/DC converter of step-down voltage type, a control voltage of a switching element is lower than a DC input voltage of the DC/DC converter. Therefore, as already shown in FIG. 3, a P-channel type field-effect transistor or a bipolar PNP transistor having a relatively high resistor value in an ON-state has been used as a switching element.

Further, to attain a higher efficiency for a DC voltage conversion, it has been attempted to use an N-channel type field-effect transistor having a relatively low resistor value in an ON-state, as already shown in FIG. 4. Usually, to operate such an N-channel type field-effect transistor, a positive gate voltage equal to or more than 10 V has to be applied to a gate terminal, and also higher driving voltage has to be applied to a drain terminal. Therefore, it becomes necessary for a DC/DC converter circuit of step-up voltage type to be provided, in order to obtain a higher driving voltage source (the driving voltage is Vcc) for driving the N-channel type field-effect transistor.

However, in this case, an extra DC/DC converter circuit of step-up voltage type is necessary to attain a higher efficiency for a DC voltage conversion. Therefore, the DC/DC converter shown in FIG. 3 has a disadvantage that the whole circuit size of the DC/DC converter becomes larger. Further, owing to the extra DC/DC converter circuit of step-up voltage type, a cost for fabricating such a DC/DC converter as in FIG. 3 is likely to increase.

On the other hand, in the case where the P-channel type field-effect transistor or a bipolar PNP transistor is used as the switching element, as shown in FIG. 3, the switching element has a relatively high resistor value in an ON-state. Therefore, the DC/DC converter shown in FIG. 3 has a disadvantage that it becomes difficult to attain a sufficiently high efficiency for a DC voltage conversion.

SUMMARY OF THE INVENTION

In view of the above-described problems, the main object of the present invention is to provide a DC/DC converter, which realizes a remarkably high efficiency for a voltage conversion and a relatively small whole size, by means of a switching control of a switching element.

A further object of the present invention is to provide a DC/DC converter, which enables higher efficiency for a voltage conversion to be attained, even in the case where an electric load connected to an output terminal of the DC/DC converter requires only a small current, with a relatively simple circuit.

A further object of the present invention is to provide a DC/DC converter of step-down voltage type, in which a field-effect transistor having a relatively low resistor value in an ON-state can be used as a switching element, with a simple additional circuit, so that a remarkably high efficiency for a voltage conversion can be ensured.

To attain these objects, the DC/DC converter according to the present invention includes a control means for outputting a control signal on the basis of a voltage difference between a DC output voltage and a predetermined reference voltage; and a switching element which is connected in series with a line for supplying the DC input voltage, and which becomes ON-state or OFF-state in accordance with the control signal.

In this case, the DC/DC converter is operative to determine either one or both of a minimum ON-state duration for which the switching element remains in ON-state and a minimum driving voltage value for driving the switching element.

In one preferred embodiment, the DC/DC converter additionally includes a minimum ON-state duration setting means for defining a predetermined minimum value in regard to an ON-state duration of the switching element. Further, the DC/DC converter fixes the ON-state duration to a value which corresponds to the predetermined minimum value defined by the minimum ON-state duration setting means, in the case where the necessary output voltage level or necessary electric power is low. Further, the DC/DC converter carries out an ON-OFF operation of the switching element on the basis of the thus fixed ON-state duration.

Preferably, the minimum ON-state duration setting means is constituted by a monostable multivibrator.

Further, preferably, the control means has an amplifier which amplifies the voltage difference between the DC output voltage and the predetermined reference voltage; and a comparator which outputs a PWM signal in accordance with a comparison result obtained by comparing the thus amplified voltage difference with a voltage of a predetermined saw tooth wave.

In this case, the DC/DC converter has a minimum ON-state duration determining means for limiting a voltage value of the saw tooth wave to a constant value so as to obtain an adequate minimum ON-state duration of the switching element.

Further, in this case, the DC/DC converter compares a voltage difference value output from the amplifier with the thus limited voltage value of the saw tooth wave, by utilizing the comparator, and carries out an ON-OFF operation of the switching element, by changing a frequency of the PWM signal on the basis of the minimum ON-state duration of the PWM signal output from the comparator.

Further, preferably, the minimum ON-state duration determining means has a reference voltage source generating a voltage level a little higher than the lowest voltage level of the saw tooth wave.

In some other preferred embodiment, the DC/DC converter includes a first serial circuit which is composed of a first diode and a first capacitor that are connected in series with each other; and a second serial circuit which is composed of a second diode and a second capacitor that are connected in series with each other, and which is arranged between a node of the first diode and the first capacitor, and a ground terminal.

In this case, the DC/DC converter takes out a voltage in which a voltage value thereof is equal to or larger than a voltage value twice as large as that of the given DC input voltage, from both terminals of the second capacitor, and defines the thus taken out voltage as a driving voltage source for driving the switching element, the driving voltage source having a voltage value not smaller than the minimum driving voltage value of the switching element.

Further, preferably, in the DC/DC converter, the voltage between both terminals of the second capacitor is supplied to at least one of any other elements than the switching element in the same DC/DC converter or at least one of the other DC/DC converters.

Further, preferably, the DC/DC converter additionally includes a switch unit having an N-channel type field-effect transistor, and is operative to define the voltage between both terminals of the second capacitor as a driving voltage source for driving the switch unit.

According to the DC/DC converter of the present invention, by virtue of a minimum ON-state duration setting means, e.g., a monostable multivibrator, an ON-state duration of the switching element is limited to a predetermined minimum value, in the case where an electric load connected to the DC/DC converter requires a relatively low electric power.

In such a construction, a frequency of a control signal, e.g., a PWM signal for controlling the switching element, can be changed to a lower value, in the case where an electric load requires a small current. Therefore, a power loss generated due to switching of the switching element can be reduced, especially when the electric load requires only a small current. Consequently, a remarkably high efficiency for a voltage conversion can be attained even in the case where a low electric power is output from the DC/DC converter.

Further, according to the DC/DC converter of the present invention, a simple charge-pumping circuit having two diodes and two capacitors is added to the switching element. In such a construction, it becomes possible to use an N-channel type field-effect transistor having a relatively low resistor value in an ON-state, without necessity for a complicated circuit for driving such an N-channel type field-effect transistor. Therefore, a remarkably high efficiency for a voltage conversion can be attained, especially in a DC/DC converter of step-down voltage type.

Further, according to the above-mentioned DC/DC converter of step-down voltage type, an output from such a charge-pumping circuit can be supplied to to elements other than the switching element in the same DC/DC converter or the other DC/DC converters. Therefore, it becomes unnecessary to provide a plurality of charge-pumping circuits, and a circuit configuration of the DC/DC converter can be simplified.

BRIEF DESCRIPTION OF THE DRAWINGS

The above object and features of the present invention will be more apparent from the following description of the preferred embodiments with reference to the accompanying drawings, wherein:

FIG. 10 is a circuit diagram showing a DC/DC converter of a second preferred embodiment according to present invention;

FIG. 11 is a time chart for explaining an operation of a second embodiment of the present invention;

FIG. 13 is a diagram showing an example of a result of measurement of the operational waveform in each of some positions in FIG. 12.

DESCRIPTION OF THE PREFERRED EMBODIMENTS

Hereinafter, some preferred embodiments of the present invention will be described in detail with reference to the related drawings of FIGS. 5 to 13.

Figure 5:
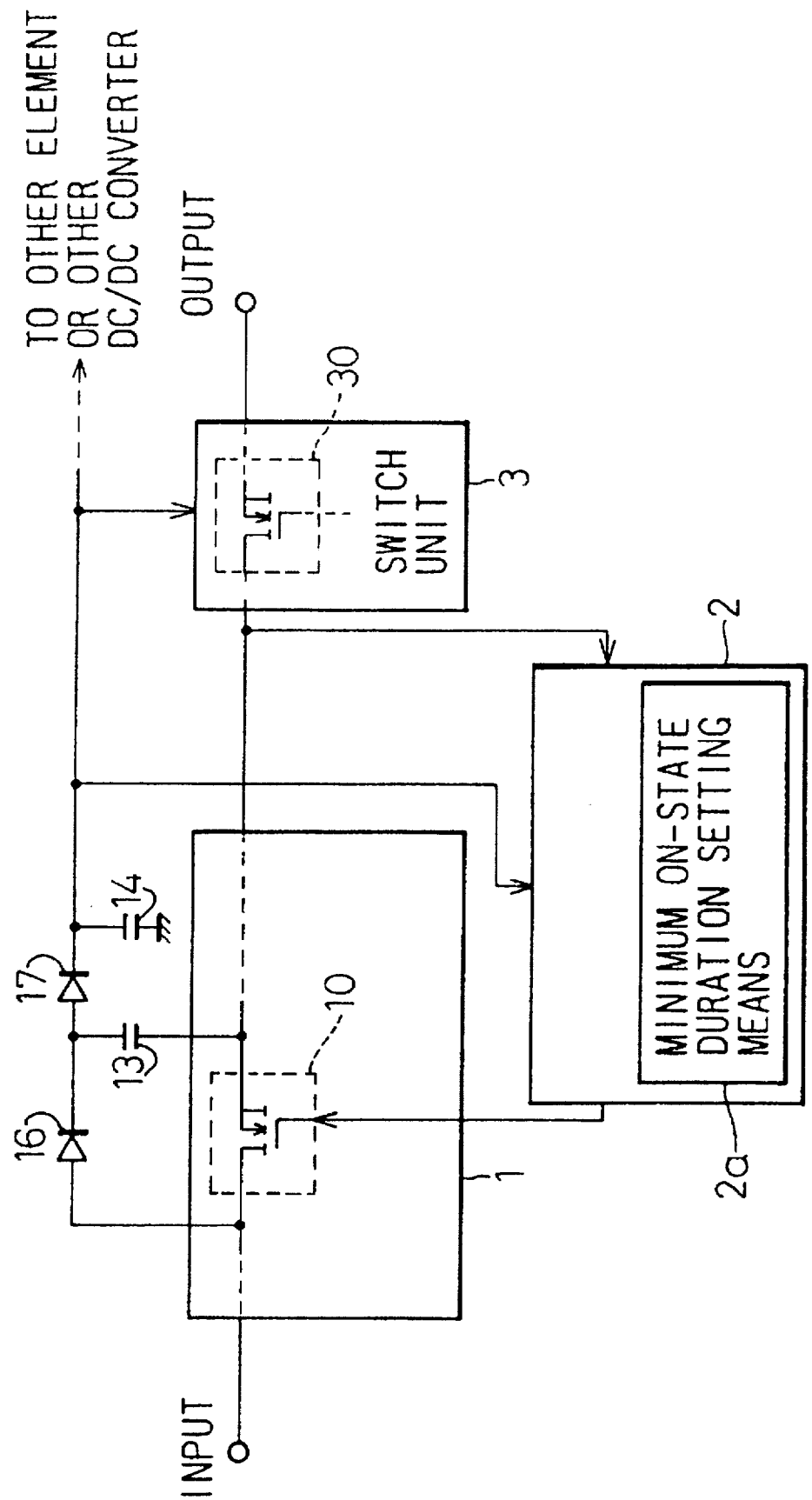
FIG. 5 is a block diagram showing an essential embodiment based on the principle of the present invention.

FIG. 5 is a block diagram showing an essential embodiment based on the principle of the present invention. In FIG. 5, 1 denotes a DC/DC conversion circuit for converting a given DC input voltage to a desired DC output voltage. The DC/DC conversion circuit 1 is mainly constituted by a switching element 10 which is connected in series with a line for supplying the DC input voltage. 2 denotes a control means which supplies the DC/DC conversion circuit 1 with a control signal for controlling an ON-OFF operation of the a switching element 10.

Further, in FIG. 5, 2a denotes a minimum ON-state duration setting means which defines a predetermined minimum value in regard to an ON-state duration of the switching element. 3 denotes a switch unit which has a switch component 30 for carrying out a switching operation, in regard to an output voltage that is output from the DC/DC conversion circuit 1 and is smoothed by a smoothing circuit (not shown). 16, 17 denote diodes for adjusting the DC input voltage to a higher voltage; and 13, 14 denotes capacitors for adjusting the DC input voltage to a higher voltage in cooperation with the diodes 16, 17.

Further, in FIG. 5, the control means 2 is operative to control ON-OFF operation of the switching element 10 with a PWM signal (control signal) having a duty factor which corresponds to a required DC output voltage of a DC/DC converter. Further, the control means 2 is operative to convert a DC input voltage to a desired output voltage.

In such a circuit configuration, when an output pulse width of the PWM signal from the control means 2 becomes narrower than a width of an ON-state duration defined by the minimum ON-state duration setting means 2a, the switching element 10 is driven in accordance with a PWM signal in which a pulse width of each pulse is fixed or determined by the minimum ON-state duration setting means 2a.

In other words, by virtue of the minimum ON-state duration setting means, e.g., a monostable multivibrator, an ON-state duration of the switching element 10 is limited to a predetermined minimum value, in the case where an electric load connected to the DC/DC converter requires a relatively low electric power.

In such a construction, a frequency of the PWM signal for controlling the switching element, can be changed to a lower value, in the case where an electric load requires a small current. Therefore, a power loss due to switching loss of the switching element 10 can be reduced, and an efficiency for a voltage conversion can be improved even in the case where a low electric power is output from the DC/DC converter.

Further, in the case where a DC/DC converter shown in FIG. 5 is a DC/DC converter of step-down voltage type, the DC/DC converter additionally includes a first serial circuit which is composed of a first diode 16 and a first capacitor 13, that are connected in series with each other; and a second serial circuit which is composed of a second diode 17 and a second capacitor 14, that are connected in series with each other. The first serial circuit having the first diode 16 and the first capacitor 13 is connected in parallel with the switching element 10. The second serial circuit is arranged between a node of the first diode 16 and the first capacitor 13, and a ground terminal.

These first and second serial circuit constitute a charge-pumping circuit. By virtue of such a charge-pumping circuit, an N-channel type field-effect transistor, which has a relatively low resistor value in an ON-state, can be used as the switching element 10 of the DC/DC conversion circuit 1 or the switch component 30 of the switch circuit 3.

In the above-mentioned charge-pumping circuit, when the switching element 10 becomes OFF-state, the first capacitor 13 is charged by means of the DC input voltage of the DC/DC converter, through the first diode 16.

Further, when the switching element 10 becomes ON-state, a voltage level in one terminal at the negative side of the first capacitor 13 increases up to the DC input voltage. Therefore, a potential in the other terminal at the positive side of the first capacitor 13 becomes equal to or larger than a voltage value twice as large as that of the DC input voltage. Electric charges, which are accumulated in the first capacitor 13, are supplied to the second capacitor 14. Subsequently, the second capacitor 14 is charged by means of the electric charges, and a voltage difference between both terminals of the second capacitor 14 becomes a value which is equal to or larger than a voltage value twice as large as that of the DC input voltage.

Such a voltage difference, which is taken out from both terminals of the second capacitor 14, can be utilized as a driving voltage source for driving the switching element 10 or the switch component 30, that is constituted by an N-channel type field-effect transistor. Namely, the driving voltage source has a voltage value not smaller than the minimum driving voltage value of the switching element, e.g., an N-channel type field-effect transistor, to which a relatively high driving voltage has to be applied.

In such a construction, by adding only a simple charge-pumping circuit having two diodes and two capacitors to the switching element, it becomes possible to use an N-channel type field-effect transistor having a relatively low resistor value in an ON-state. Therefore, a remarkably high efficiency for a voltage conversion can be attained, especially in a DC/DC converter of step-down voltage type.

Further, in such a construction, an output voltage from such a charge-pumping circuit can be supplied to elements other than the switching element in the same DC/DC converter or the other DC/DC converters. Therefore, it becomes unnecessary to provide a plurality of charge-pumping circuits, and a circuit configuration of the DC/DC converter can be simplified.

Further, in FIG. 5, at the output side of the DC/DC converter, a switch component 30 having an N-channel type field-effect transistor is provided. In the switch component 30, the voltage between both terminals of the second capacitor 14 is adapted to be used as a driving voltage source for driving the switch component 30. Therefore, a circuit configuration of the DC/DC converter including the switch component 30 can also be simplified.

Figure 6:
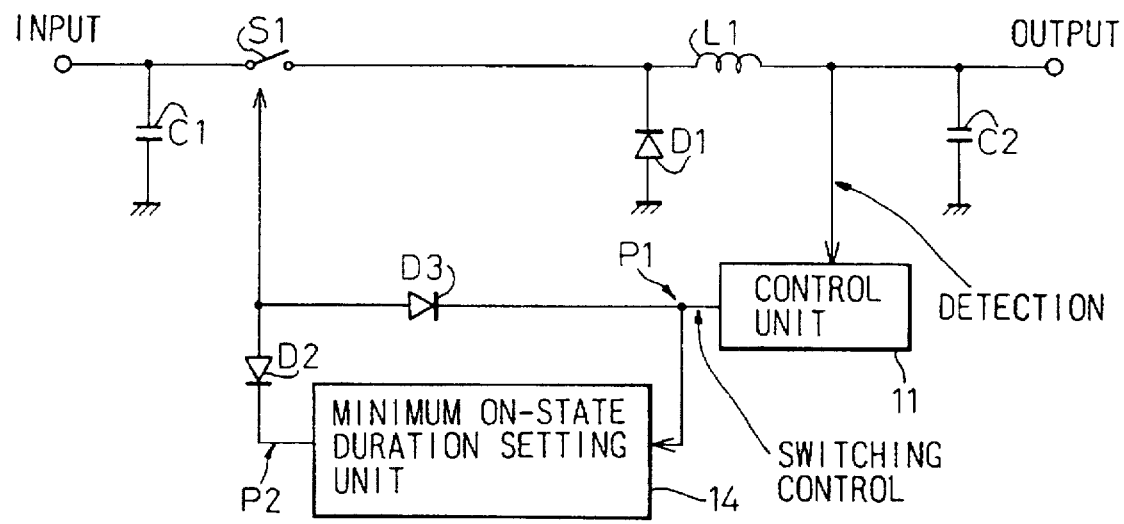
FIG. 6 is a circuit diagram showing a DC/DC converter of a first preferred embodiment according to present invention.

FIG. 6 is a circuit diagram showing a DC/DC converter of a first preferred embodiment according to present invention.

In FIG. 6, a concrete embodiment is illustrated, in which a power loss due to switching loss of a switching element can be reduced in the case where a low electric power is supplied to an electric load by a DC/DC converter.

The DC/DC converter shown in FIG. 6 includes a switching element S1; capacitors C1 and C2; a diode D1, an inductance coil L1, e.g., a choke coil; and a control unit 11 which output a PWM signal for controlling an ON-OFF operation of the switching element S1, on the basis of detection result of an output DC voltage from the DC/DC converter. These elements and unit are similar to those of a DC/DC converter of the prior art (for example, shown in FIG. 1).

As shown in FIG. 6, the DC/DC converter of the first preferred embodiment further includes a minimum ON-state duration setting unit 14, which corresponds to the a minimum ON-state duration setting means 1 and defines a predetermined minimum value in regard to an ON-state duration of the switching element S1.

Further, in FIG. 6, a diode D2 is provided between the switching element S1 and the minimum ON-state duration setting unit 14. Further, a diode D3 is provided between the switching element S1 and the control unit 11. A logical sum (OR) circuit is constituted by these pair of diodes D2 and D3. The OR circuit is adapted to select a pulse signal in which each pulse thereof has the wider pulse width, among an output signal from the control unit 11 and another output signal from the minimum ON-state duration setting unit 14.

Figure 7:
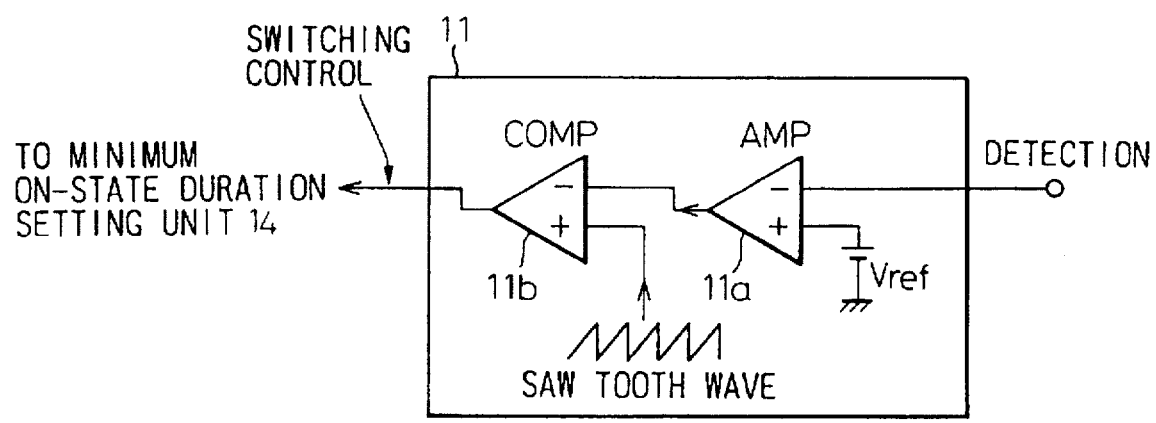
FIG. 7 is a circuit diagram showing a circuit configuration of a control unit in FIG. 6.

FIG. 7 is a circuit diagram showing a circuit configuration of a control unit in FIG. 6.

Figure 2:
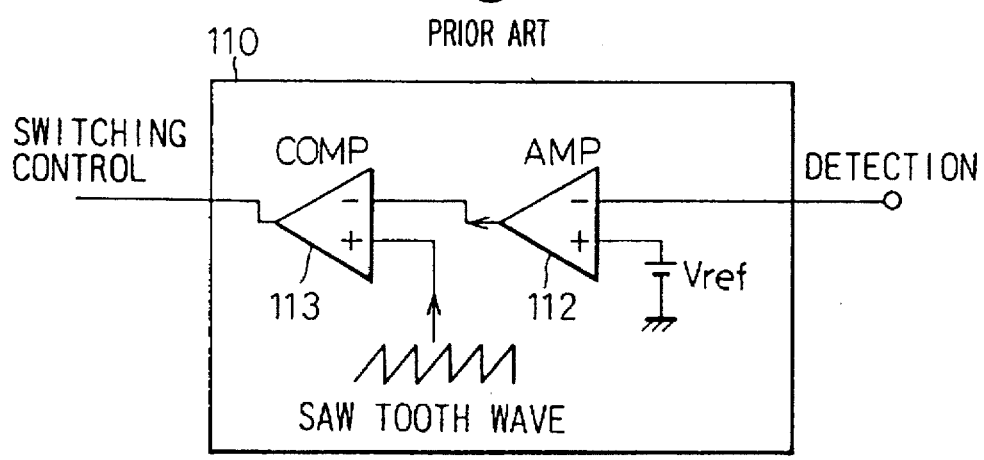
FIG. 2 is a circuit diagram showing a circuit configuration of a control unit in FIG. 1.

A control unit in FIG. 6 has the same circuit configuration as that in FIG. 2, except that an output terminal of the control unit in FIG. 6 is connected to both of a cathode of the diodes D2 and the minimum ON-state duration setting unit 14.

An amplifier (AMP) 11a and a comparator (COMP) 11b in FIG. 7 has the same functions as those of the amplifier 112 and the comparator 113 in FIG. 2, respectively. Accordingly, the detailed description concerning the circuit configuration of the control unit 11 in FIG. 7 will be omitted.

Figure 8:
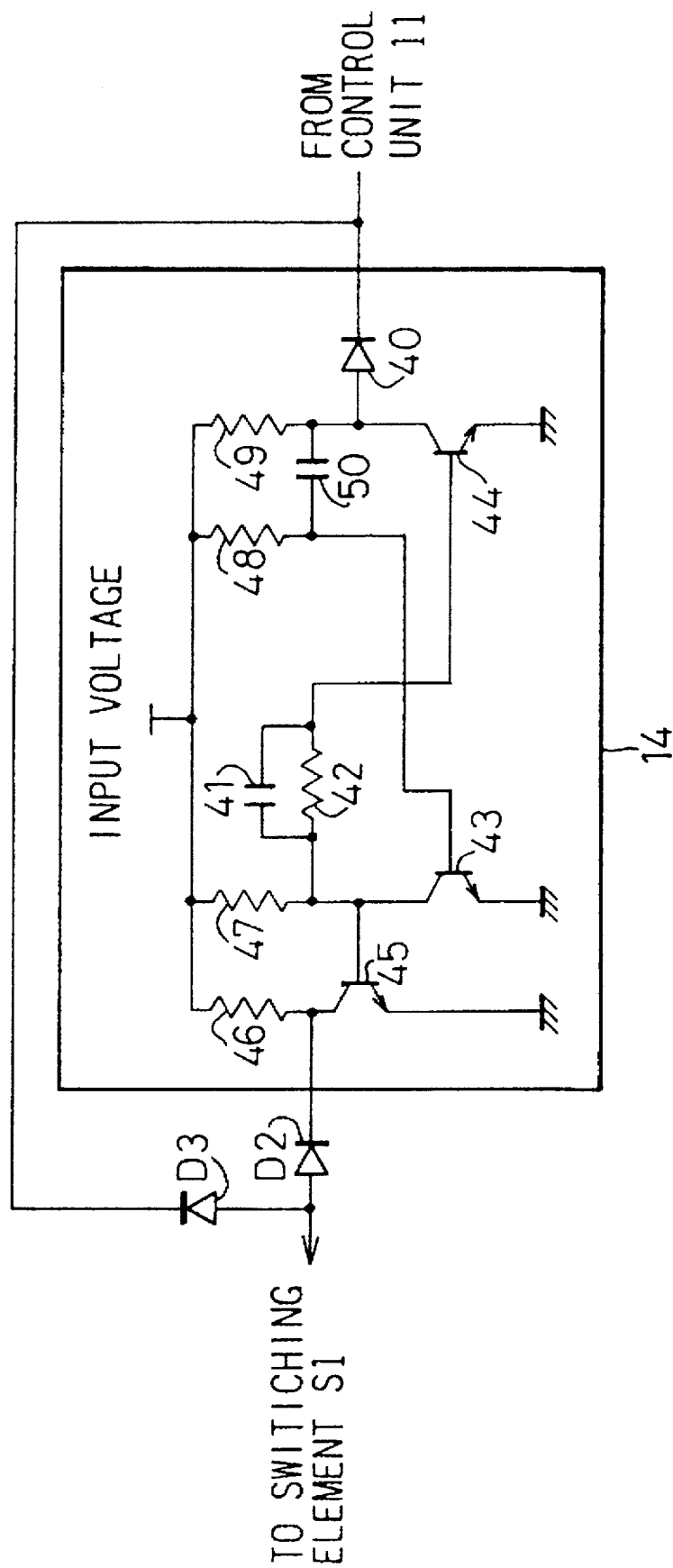
FIG. 8 is a circuit diagram showing an example of a circuit configuration of a minimum ON-state duration setting unit in FIG. 6.

FIG. 8 is a circuit diagram showing an example of a circuit configuration of a minimum ON-state duration setting unit in FIG. 6.

As shown in FIG. 8, a minimum ON-state duration setting unit 14 can be easily constituted by utilizing a conventional monostable multivibrator. The monostable multivibrator is also referred to as one shot multivibrator, and generates a pulse signal constituted by a series of rectangular pulses. A pulse width of each of the rectangular pulses is determined by a time constant of some elements (capacitor and resistor) in the monostable multivibrator.

More specifically, in the monostable multivibrator shown in FIG. 8, a pair of transistors 43, 44 are coupled with each other in the following manner:

an input terminal of one of the transistors is coupled with an output terminal of the other one of the transistors (for example, a transistor 43), through a CR-coupling by a capacitor 41 and a resistor 42; and an output terminal of one of the transistors is coupled with an input terminal of the other one of the transistors (for example, a transistor 44), through a DC-coupling by a capacitor 50.

Further, in FIG. 8, four resistors 46, 47, 48 and 49 are provided, in order to supply an input voltage for driving the monostable multivibrator to the respective input and output of the transistors. Further, a transistor 45 is provided at the output side of the monostable multivibrator, in order to supply an adequate control signal to the switching element S1.

In such a circuit configuration, an ON-state or an OFF-state of each of the pair of transistors is temporarily reversed by supplying a trigger signal to each transistor. However, after the time corresponding to a time constant determined by the CR-coupling has lapsed, an ON-state or an OFF-state of each transistor goes back to the original state. Therefore, a pulse width of each rectangular pulse, which corresponds to an ON-state duration of one of the transistors, is fixed to a constant value. Consequently, the thus fixed pulse width can be defined as predetermined minimum value by utilizing a monostable multivibrator which is easily available.

Figure 9A:
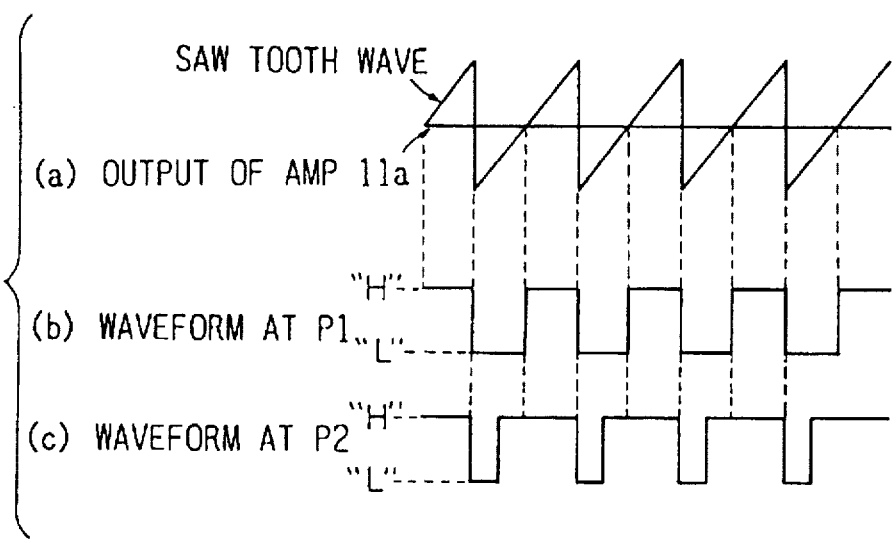
FIG. 9(A) is a time chart for explaining an operation of a first embodiment according to present invention in the case where an electric load requires a large current.
Figure 9B:
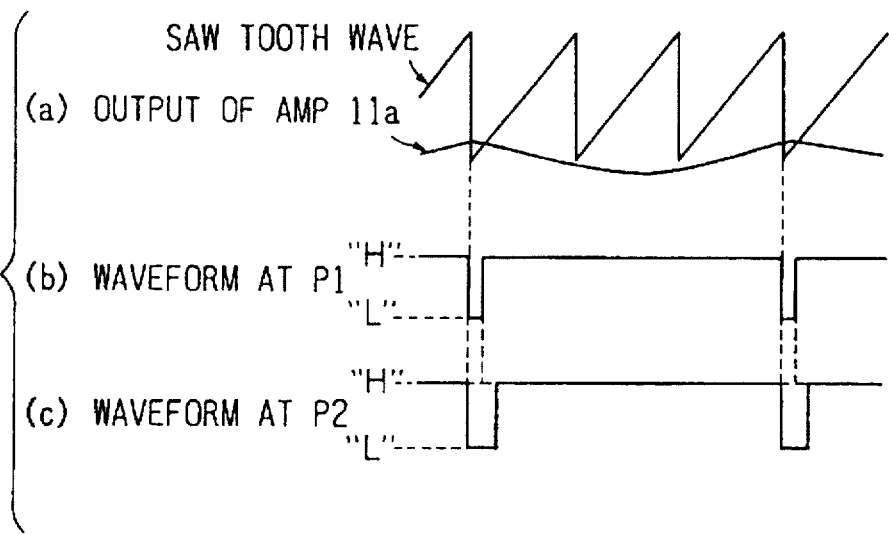
FIG. 9(B) is a time chart for explaining an operation of a first embodiment of the present invention in the case where an electric load requires a small current.

FIG. 9(A) is a time chart for explaining an operation of a first embodiment according to present invention in the case where an electric load requires a large current; and FIG. 9(B) is a time chart for explaining an operation of the first embodiment in the case where an electric load requires a small current. In FIG. 9(A), the operational waveform of some points in a DC/DC converter is illustrated in the case where an electric load connected to the DC/DC converter is heavy. On the other hand, in FIG. 9(B), the operational waveform of some points in a DC/DC converter is also illustrated in the case where the electric load is light. Waveform at points P1 and P2 (shown in (b) and (c) portions of FIGS. 9(A) and 9(B)) indicates the waveform at points P1 and P2 shown in FIG. 6, respectively.

Hereinafter, an operation of the first preferred embodiment will be described in detail with reference to FIG. 6.

In the case where the electric load requires a large current, as shown in (a) portion of FIG. 9(A), a voltage level output from an amplifier 11a is in an approximately intermediate level of peak-to-peak voltage of saw tooth wave.

Further, as shown in (b) portion of FIG. 9(A), the comparator 11b outputs a pulse signal in which a period (pulse width) of each pulse when an output level thereof assumes "H (high)" (ON-state duration) is approximately equal to the remaining period of each pulse when an output level assumes "L (low)" (OFF-state duration). On the other hand, as shown in (c) portion of FIG. 9(A), a minimum ON-state duration setting unit 14 outputs a pulse signal in which a period of each pulse when an output level assumes "L" has a predetermined minimum value, in the case where the control unit 11 outputs a certain pulse signal.

Further, the OR circuit having the two diodes D2 and D3 already shown in FIG. 6 selects a pulse signal in which each pulse thereof has the wider pulse width, among an output signal from the control unit 11 and another output signal from the minimum ON-state duration setting unit 14. In this case, it should be noted that it is assumed that a period when an output level assumes "L" is defined as a pulse width; namely, it is assumed that negative pulses are generated. Subsequently, the thus selected pulse signal is supplied to the switching element S1, as a PWM signal for controlling an ON-OFF operation of the switching element S1.

In the case where an electric power requires a large current, as shown in FIG. 9(A), a pulse width of each negative pulse in a pulse signal output from the control unit 11 is longer than that of each negative pulse in a pulse signal output from the minimum ON-state duration setting unit 14. At this time, the switching element S1 is driven by a PWM signal corresponding to a pulse signal which is output from the control unit 11. When an output level of each pulse in the PWM signal assumes "L", the switching element S1 becomes ON-state.

In such a manner, the switching element S1 becomes ON-state or OFF-state in accordance with the PWM signal, and therefore a DC output voltage having an average voltage level of the PWM signal is taken out from an output terminal of the DC/DC converter.

In the case where an electric power requires a small current, as shown in (a) portion of FIG. 9(B), a voltage level of an output signal from an amplifier 11a (FIG. 7) decreases. Therefore, as shown in (b) portion of FIG. 9(B), a comparator 11b (FIG. 7) outputs a pulse signal in which a pulse width of "L" level in each negative pulse is relatively narrow.

On the other hand, as shown in (c) portion of FIG. 9(B), a minimum ON-state duration setting unit 14 outputs a pulse signal in which a pulse width of "L" level in each negative pulse is fixed to a predetermined minimum value.

Accordingly, when a pulse width of "L" level in a pulse signal output from the control unit 11 becomes narrower than that of "L" level in a pulse signal output from the minimum ON-state duration setting unit 14, the two diodes D2 and D3 select a latter pulse signal from the minimum ON-state duration setting unit 14. The thus selected pulse signal is supplied to the switching element S1. The switching element S1 is driven by a PWM signal corresponding to a pulse signal which is output from the minimum ON-state duration setting unit 14. When an output level of each pulse in the PWM signal assumes "L", the switching element S1 becomes ON-state.

The control unit 11 is originally designed to output a PWM signal corresponding to a DC output voltage value which is required by the DC/DC converter. However, in the condition that the minimum ON-state duration setting unit 14 is additionally provided in the DC/DC converter, a pulse width of each pulse in a pulse signal output from the minimum ON-state duration setting unit 14 is wider than that of each pulse in a PWM signal which is to be output from the control unit 11.

Therefore, as shown in (a) portion of FIG. 9(B), a voltage level of an output signal from an amplifier 11a (FIG. 7) gradually decreases after a certain pulse is generated, and increases again in several cycles. Finally, the control unit 11 operates so that an average level of an output voltage of the DC/DC converter is adjusted to the voltage value which is required by the DC/DC converter. As apparent from (c) portion of FIG. 9(B) and the above description, the comparator 11b (FIG. 7) outputs a pulse signal having pulses at every several cycles.

As mentioned above, in the case where an electric load connected to the DC/DC converter requires a small current, i.e., a low electric power, the switching element S1 carrys out an ON-OFF operation with a frequency lower than that of a saw tooth wave. Further, on the basis of an ON-OFF operation of the switching element S1, a desired DC output voltage is obtained from an output terminal of the DC/DC converter.

In the first preferred embodiment shown in FIGS. 5 to 9(B), in the case where an electric load requires a low electric power, an ON-OFF operation of the switching element S1 is executed in accordance with a pulse signal which is output from the minimum ON-state duration setting unit 14. In this case, an ON-OFF operation (i.e., a switching operation) of the switching element S1 is controlled with a switching frequency lower than that in the case of conventional PWM control.

In such a condition, the number of times of switching in the switching element S1 becomes smaller than the case of the prior art (for example, FIG. 1) in a given time period. Therefore, a power loss due to switching loss of a switching element can be reduced, in the case where a low electric power is supplied to an electric load.

FIG. 10 is a circuit diagram showing a DC/DC converter of a second preferred embodiment according to present invention.

In FIG. 10, a concrete embodiment is illustrated, in which a power loss due to switching loss of a switching element can be also reduced, by limiting a voltage value of a saw tooth wave to a predetermined value and obtaining an adequate minimum ON-state duration of the switching element, in the case where a low electric power is supplied to an electric load by a DC/DC converter.

A circuit configuration of a DC/DC converter in the second preferred embodiment is similar to that of a DC/DC converter in the first preferred embodiment described before. However, only a circuit configuration of a control unit 11' of the second preferred embodiment is different from the control unit 11 already shown in FIG. 7. Accordingly, in FIG. 10, a circuit configuration of only a control unit 11' in the whole DC/DC converter is illustrated representatively.

More specifically, in FIG. 10, the control unit 11' includes a reference voltage source which generates another reference voltage Vref2 and two diodes D4 and D5. The reference voltage source and the two diodes D4 and D5 constitute a minimum ON-state duration determining means. These elements are additionally provided to generate a pulse signal having an adequate minimum ON-state duration of the switching element S1 within the control unit 11 already shown in FIG. 7.

FIG. 11 is a time chart for explaining an operation of a second embodiment of the present invention.

In FIG. 11, the operational waveform of a specified point in a DC/DC converter is illustrated in the case where an electric load connected to the DC/DC converter requires a low electric power.

Hereinafter, an operation of the second preferred embodiment will be described in detail with reference to FIG. 11.

In FIG. 10 already shown, a voltage level of the reference voltage Vref2 is set to the level which is a little higher than the lowest voltage level of a saw tooth wave. Further, the two diodes D4 and D5 are adapted to select a signal having the higher voltage level, among the reference voltage Vref2 and a voltage of the saw tooth wave, and adapted to supply the thus selected signal to the comparator 11b.

Consequently, as shown in (a) portion of FIG. 11, the voltage waveform at a point P3, i.e., voltage waveform in an inversion terminal (−) of the comparator 11b, has a shape such that the lower portion of the voltage of the saw tooth wave is limited by the reference voltage Vref2.

In the case where an electric load connected to a DC/DC converter requires a low electric power, an output voltage as shown in (b) portion of FIG. 11 is taken out from the amplifier 11a. Therefore, as shown in (c) portion of FIG. 11, the comparator 11b outputs a pulse signal for a switching control of the switching element S1, in which a pulse width corresponding to the minimum ON-state duration of the switching element S1 is adjusted to a predetermined value.

Further, the minimum pulse width, that is output from the comparator 11b, can be adequately selected in accordance with a voltage level of the reference voltage Vref2. More specifically, if a voltage level of the reference voltage Vref2 increases, the minimum pulse width becomes wider. On the other hand, if a voltage level of the reference voltage Vref2 decreases, the minimum pulse width becomes narrower.

In the second preferred embodiment shown in FIGS. 10 and 11, in the case where an electric load requires a low electric power, an ON-OFF operation of the switching element S1 is executed in accordance with a control signal in which the minimum pulse width is adjusted to a predetermined value in the comparator 11b of the control unit 11'.

Therefore, similar to the first preferred embodiment, a switching operation of the switching element is controlled with a switching frequency lower than that in the case of conventional PWM control.

Also, the number of times of switching in the switching element becomes smaller than the case of the prior art in a given time period. Therefore, a power loss due to switching loss of a switching element can be reduced, in the case where a low electric power is supplied to an electric load.

Further, in each of the first and second preferred embodiments, an example of a DC/DC converter is illustrated, in which a switching element becomes ON-state when an output level of the control unit 11 (or the control unit 11') assumes "L". However, it is also possible for a DC/DC converter to operate so that the switching element becomes ON-state when an output level of a control unit assumes "H". In this case, an output voltage level of an amplifier in a control unit increases in the case where a low electric power is supplied to an electric load. Further, the abovementioned reference voltage Vref2 is set to the level which is a little lower than the highest voltage level of a saw tooth wave.

In principle, in each of the above-mentioned embodiments, a DC/DC converter of step-down voltage type is described. However, the scope and object to which the present invention can be applied are not limited only to the DC/DC converter of step-down voltage type. On the contrary, the present invention can be also applied to a DC/DC converter of any other type.

Figure 12:
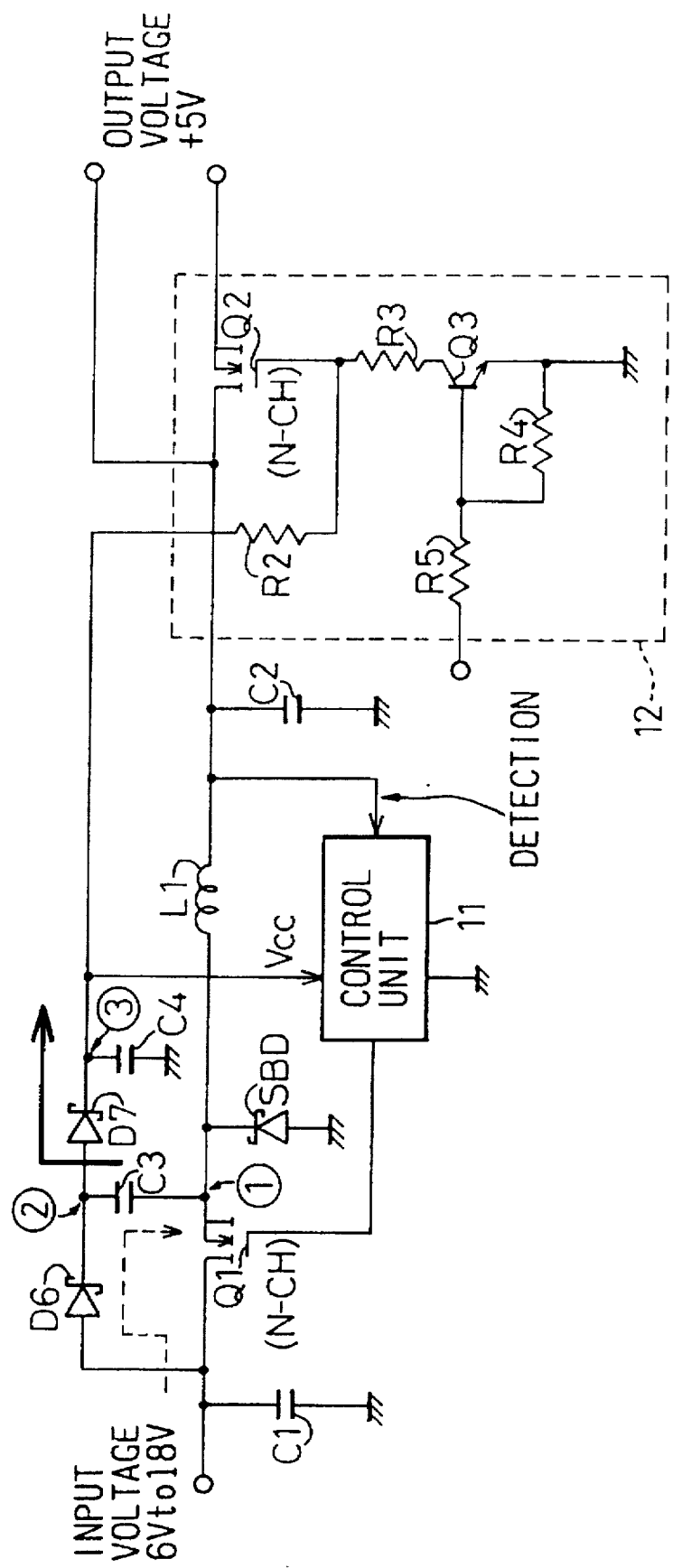
FIG. 12 is a circuit diagram showing a DC/DC converter of a third preferred embodiment according to the present invention.

FIG. 12 is a circuit diagram showing a DC/DC converter of a third preferred embodiment according to the present invention.

In FIG. 12, a concrete embodiment is illustrated, in which it becomes possible to use an N-channel type field-effect transistor having a relatively low resistor value in an ON-state by adding a simple circuit, especially in a DC/DC converter of step-down voltage type.

The DC/DC converter shown in FIG. 12 includes a switching element Q1; capacitors C1 and C2; a diode D1, an inductance coil L1; and a control unit 11 which output a PWM signal for controlling an ON-OFF operation of the switching element S1.

Figure 1:
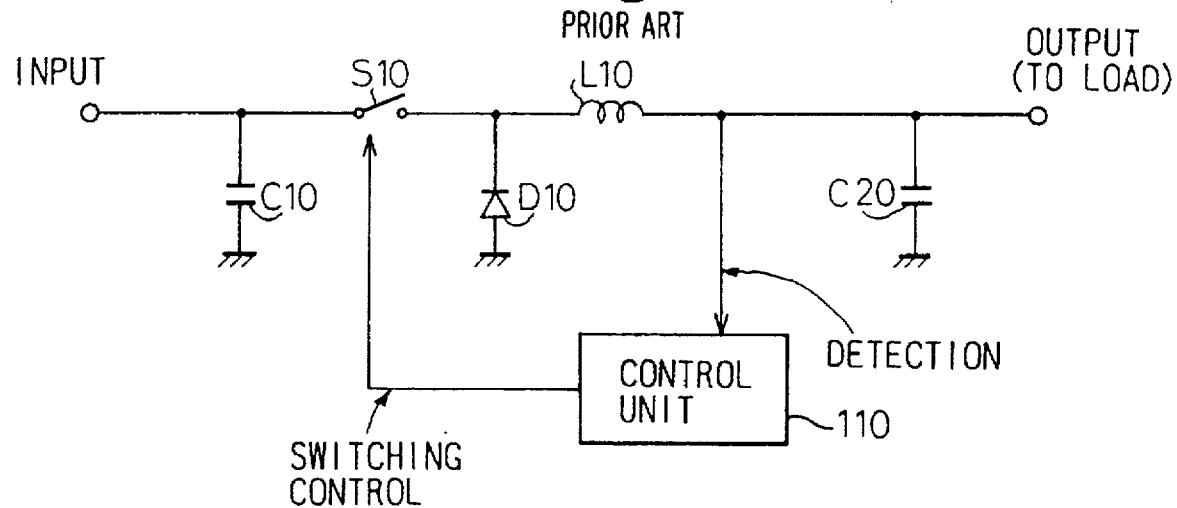
FIG. 1 is a circuit diagram showing a first example of a DC/DC converter of the prior art.

Further, in FIG. 12, a Schottky barrier diode SBD is used as a circuit element corresponding to the diode D10 shown in FIG. 1.

Further, in the figure, a switch circuit 12, which is mainly constituted by a field-effect transistor Q2, is provided at the output side of the DC/DC converter. The switch circuit 12 includes resistors R2, R3 for adequately adjusting operating characteristics of the field-effect transistor Q2. Further, the switch circuit 12 includes a bipolar transistor Q3 for supplying an adequate electric current to the field-effect transistor Q2; and other resistors R4, R5 for determining an operating point of the bipolar transistor Q3.

Figure 3:
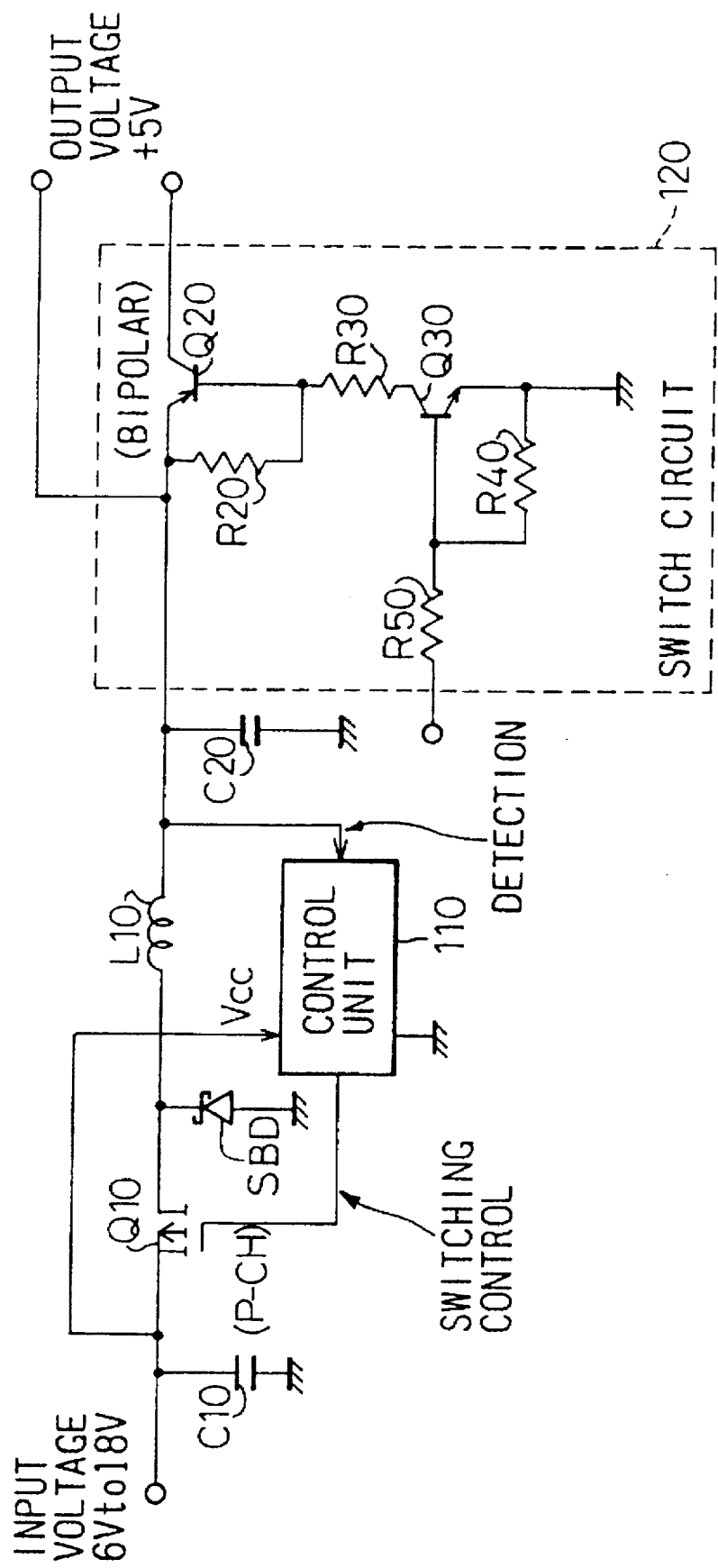
FIG. 3 is a circuit diagram showing a second example of a DC/DC converter of the prior art.

These elements and units are similar to those of a DC/DC converter of the prior art (for example, shown in FIG. 3).

As shown in FIG. 12, the DC/DC converter of the third preferred embodiment additionally includes a first serial circuit which is composed of a first diode D6 and a first capacitor C3, that are connected in series with each other; and a second serial circuit which is composed of a second diode D7 and a second capacitor C4, that are connected in series with each other. The first serial circuit having the first diode D6 and the first capacitor D3 is connected in parallel with the switching element Q1. The second serial circuit is arranged between a node of the first diode D6 and the first capacitor C3, and a ground terminal.

These first and second serial circuit constitute a charge-pumping circuit. By virtue of such a charge-pumping circuit, N-channel type field-effect transistors, each of which has a relatively low resistor value in an ON-state, can be used as the switching element Q1 and the field-effect transistor Q2 of the switch circuit 12. Further, a driving voltage (Vcc) for driving each of these N-channel type field-effect transistors is taken out from an output terminal of the first capacitor C4.

Hereinafter, an operation of the second preferred embodiment will be described in detail with reference to FIG. 12.

In the figure, when the switching element Q1 becomes OFF-state, the first capacitor C3 is charged by means of the DC input voltage of the DC/DC converter, through the first diode D6. Therefore, electric charges are accumulated in the first capacitor C3.

Further, when the switching element Q1 becomes ON-state, a voltage level in one terminal at the negative side (point ①) of the first capacitor C3 increases up to the DC input voltage (typically, 6 V to 18 V). Therefore, a potential in the other terminal at the positive side (point ②) of the first capacitor C3 becomes equal to or larger than a voltage value twice as large as that of the DC input voltage. Electric charges, which have been accumulated in the first capacitor C3, are supplied to the second capacitor C4.

Subsequently, the second capacitor C4 is charged by means of the electric charges, and a voltage level of a voltage at an output terminal (point ③) of the second capacitor C4 becomes a value which is equal to or larger than a voltage value twice as large as that of the DC input voltage.

Such a voltage, which is taken out from the output terminal of the second capacitor C4, is supplied to the control unit 11, and can be utilized as a driving voltage source for driving the switching element Q1, i.e. an N-channel type field-effect transistor. Also, the voltage at the output terminal of the second capacitor C4 is supplied to the switch circuit 12, and can be utilized as a driving voltage source for driving the N-channel type field-effect transistor Q2. Consequently, the driving voltage source has a voltage value not smaller than the minimum driving voltage value of each of the N-channel type field-effect transistors.

Figure 4:
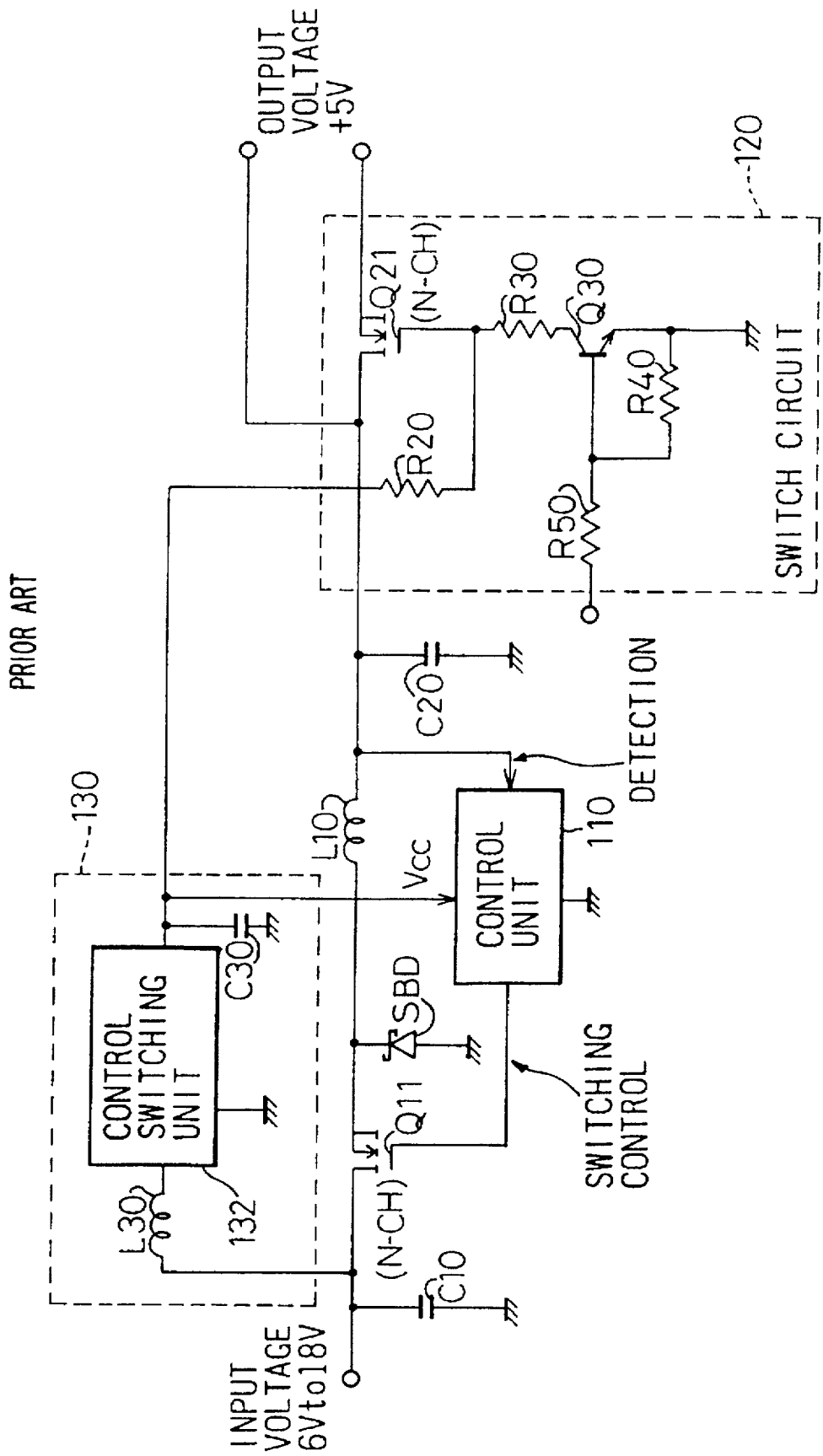
FIG. 4 is a circuit diagram showing a third example of a DC/DC converter of the prior art.

In the third preferred embodiment shown in FIG. 12, by providing only a simple charge-pumping circuit having two diodes and two capacitors, a driving voltage source for each of the N-channel type field-effect transistors can be obtained, without using a DC/DC converter circuit of step-up voltage type as in FIG. 4.

The N-channel type field-effect transistor usually has a relatively low resistor value in an ON-state. Therefore, a remarkably high efficiency for a voltage conversion can be attained with a simple circuit configuration.

Further, in this embodiment, an output voltage from such a charge-pumping circuit can be also supplied to elements and units other than the switching element Q1 and field-effect transistor Q2 in the same DC/DC converter. Further, an output voltage from the charge-pumping circuit can be used in common for the other DC/DC converters.

FIG. 13 is a diagram showing an example of a result of measurement of the operational waveform of each of some positions (positions ①, ②, and ③) in FIG. 12.

In FIG. 13, it is assumed that a voltage value of a DC input voltage of a DC/DC converter is 12 V, and a voltage value of a DC output voltage thereof is 5 V. In such a condition, a voltage at each of the positions ①, ②, and ③, and a switching current which flows through the switching element are measured. The result of the measurement estimation is illustrated in one graph of FIG. 13.

Further, in the graph of FIG. 13, (a) portion indicates the voltage waveform of a voltage at the position ①; (b) portion indicates the voltage waveform of a voltage at the position ③; (c) portion indicates the voltage waveform of a voltage at the position ②; and (d) portion indicates the waveform of a switching current which flows through the switching element.

Further, in the graph of FIG. 13, an axis of ordinate indicates a voltage or a current, while an axis of abscissa indicates time. For example, a voltage value for one division of the axis of abscissa (voltage) is 10 V/div; a current value for one division of the axis of abscissa (current) is 0.5A/div; and the time length of the axis of abscissa is 2 μs/div.

In (a) portion of FIG. 13, a peak voltage value Vp corresponds to a voltage value of the DC input voltage. Further, in (c) portion, a DC voltage having a constant voltage value Vc4 is obtained from an output terminal of the second capacitor C4.

As apparent from the graph of FIG. 13, the voltage value Vc4 is equal to or larger than a voltage value twice as large as that of the DC input voltage (Vp). In practical, due to the existence of some electric noise, the voltage value Vc4 can be larger than a voltage value twice as large as that of the DC input voltage. Consequently, a DC voltage, which is taken out from an output terminal of the second capacitor C4, can be utilized as an driving voltage source for driving a N-channel type field-effect transistor.

While the present invention has been described as related to some preferred embodiments, it will be understood that various changes and modifications may be made without departing from the spirit and the scope of the invention as hereinafter claimed.

We claim:

1. A DC/DC converter that converts a DC input voltage to a DC output voltage which is supplied to an electric load, the DC/DC converter comprising:

a control unit producing a control signal on the basis of a voltage difference between said DC output voltage and a predetermined reference voltage, the control signal being a pulse width modulated control signal with a constant switching frequency;

a switching element connected in series with a line for supplying said DC input voltage, and adapted to become ON-state or OFF-state in accordance with the pulse width modulation and constant switching frequency of said control signal, so as to obtain said DC output voltage having an output voltage level sufficient for said electric load; and a minimum ON-state duration setting unit defining a predetermined minimum value of an ON-state duration for which said switching element remains in ON-state and, when said DC output voltage level sufficient for said electric load is low, said minimum ON-state duration setting unit adjusts the control signal produced by the control unit to fix said ON-state duration to a value which corresponds to said predetermined minimum value defined by said minimum ON-state duration setting unit, to thereby control the ON-state and OFF-state of said switching element on the basis of the fixed ON-state duration.

2. A DC/DC converter as set forth in claim 1, wherein said minimum ON-state duration setting unit comprises a monostable multivibrator.

3. A DC/DC converter as set forth in claim 1, wherein said control unit comprises:

an amplifier which compares said DC output voltage with a predetermined reference voltage to determine said voltage difference and amplifies said voltage difference; and a comparator which outputs a pulse width modulation signal in accordance with a comparison result obtained by comparing the amplified voltage difference with a voltage of a predetermined saw tooth wave, said control unit controlling the ON-state and the OFF-state of said switching element by utilizing said pulse width modulation signal as said control signal, wherein said minimum ON-state duration setting unit limits a voltage value of said saw tooth wave to a constant value so as to obtain an adequate minimum ON-state duration of said switching element, said comparator of said control unit compares a voltage difference value output from said amplifier of said control unit with the limited voltage value of said saw tooth wave and said DC/DC converter controls the ON-state and OFF-state of said switching element by changing a frequency of said pulse width modulation signal on the basis of said minimum ON-state duration of said pulse width modulation signal output from said comparator.

4. A DC/DC converter as set forth in claim 3, wherein said minimum ON-state duration setting unit includes a reference voltage source which generates a reference voltage having a voltage level higher than the lowest voltage level of said saw tooth wave.

5. A DC/DC converter as set forth in claim 1, wherein said DC/DC converter further comprises:

a first serial circuit comprising a diode and a capacitor connected in series with each other with a node in between; and a second serial circuit comprising a diode and a capacitor connected in series with each other and arranged between the node of said first serial circuit and a ground terminal, said DC/DC converter operative to take out a voltage in which a voltage value thereof is equal to or larger than a voltage value twice as large as that of said given DC input voltage, from both terminals of said capacitor of said second serial circuit, and operative to define the taken out voltage as a driving voltage source for driving said switching element, said driving voltage source having a voltage value not smaller than said minimum driving voltage value of said switching element.

6. A DC/DC converter as set forth in claim 5, wherein the voltage between both terminals of said capacitor of said second serial circuit is adapted to be supplied to at least one other element than said switching element in the DC/DC converter or to a different DC/DC converter.

7. A DC/DC converter as set forth in claim 5, wherein said DC/DC converter further comprises a switch unit having an N-channel type field-effect transistor, and said DC/DC converter is operative to define the voltage between both terminals of said capacitor of said second serial circuit as a driving voltage source for driving said switch unit.

8. A DC/DC converter as set forth in claim 6, wherein said DC/DC converter further comprises a switch unit having an N-channel type field-effect transistor, and said DC/DC converter is operative to define the voltage between both terminals of said capacitor of said second serial circuit as a driving voltage source for driving said switch unit.

9. A DC/DC converter that converts a DC input voltage to a DC output voltage and supplies the DC output voltage to an electric load, the DC/DC converter comprising:

a control unit receiving the DC output voltage and a reference voltage, determining a voltage difference between the DC output voltage and the reference voltage and producing a control signal corresponding to the voltage difference, the control signal being a pulse width modulated control signal with a constant switching frequency;

a switching element connected to the DC input voltage and selectively switchable to an ON state and an OFF state in accordance with the pulse width modulation and constant switching frequency of the control signal produced by the control unit, the duration in which the switching element is in the ON state being the ON state duration, the switching element being selectively switchable to determine an output voltage level of the DC output voltage to be sufficient for the electric load; and a minimum ON state duration setting unit determining a minimum value of the ON state duration and, when said DC output voltage level sufficient for said electric load is relatively low, the minimum ON-state duration setting unit adjusts the control signal produced by the control unit to set the ON state duration of the switching element to a value corresponding to the minimum value determined by the minimum ON state duration setting unit.

10. A DC/DC converter as set forth in claim 9, wherein said minimum ON state duration setting unit comprises a monostable multivibrator.

11. A DC/DC converter as set forth in claim 9, wherein said control unit comprises:

an amplifier comparing the DC output voltage with the reference voltage to determine the voltage difference, and amplifying said voltage difference; and a comparator receiving the amplified voltage difference from the amplifier and a predetermined saw tooth wave, comparing the amplified voltage difference with the saw tooth wave, and producing a signal in accordance with the comparison, wherein the control unit uses the signal produced by the comparator as the control signal and controls the ON state and the OFF state of the switching element in accordance with the control signal, the minimum ON state duration setting unit limits a voltage value of the saw tooth wave to a constant value to obtain a minimum value of the ON state duration, the comparator of the control unit compares the amplified voltage difference of amplifier with the limited voltage value of the saw tooth wave and the DC/DC converter controls the ON state and the OFF state of the switching element by changing the frequency of the signal produced by the comparator on the basis of the minimum value of the ON state duration.

12. A DC/DC converter as set forth in claim 11, wherein the minimum ON state duration setting unit includes a reference voltage source which generates a reference voltage for determining the minimum value of the ON state duration, the reference voltage having a voltage level higher than the lowest voltage level of the saw tooth wave.

13. A DC/DC converter as set forth in claim 10, further comprising:

a first serial circuit comprising a diode and a capacitor connected in series with each other with a node in between; and a second serial circuit comprising a diode and a capacitor connected in series with each other and arranged between the node of said first serial circuit and a ground terminal, the DC/DC converter operative to produce a voltage across the capacitor of the second serial circuit which is equal to or larger than twice the DC input voltage and to use the produced voltage for driving the switching element, the produced voltage not being smaller than the minimum driving voltage of the switching element.

14. A DC/DC converter as set forth in claim 13, wherein the voltage across the capacitor of the second serial circuit is supplied to the switching element and to other components inside the DC/DC converter.

15. A DC/DC converter as set forth in claim 13, further comprising a switch unit having an N-channel type field-effect transistor, the DC/DC converter using the voltage across the capacitor of the second serial circuit to drive the switch unit.

16. A DC/DC converter as set forth in claim 14, further comprising a switch unit having an N-channel type field-effect transistor, the DC/DC converter using the voltage across the capacitor of the second serial circuit to drive the switch unit.

17. A DC/DC converter that converts a DC input voltage to a DC output voltage and supplies the DC output voltage to a load, the DC/DC converter comprising:

a switching element connected to the DC input voltage and selectively switchable to an ON state and an OFF state, the duration in which the switching element is in the ON state being an ON state duration of the switching element, the switching element being selectively switchable to determine an output voltage level of the DC output voltage to be sufficient for the load;

a control unit receiving the DC output voltage and a reference voltage, determining a voltage difference between the DC output voltage and the reference voltage and producing a control signal corresponding to the voltage difference, the control signal being a pulse width modulated control signal with a constant switching frequency;

a minimum ON state duration setting unit determining a minimum value of the ON state duration, wherein when the DC output voltage level sufficient for the load is relatively high, the ON state and OFF state of the switching element is controlled in accordance with the pulse width modulation and constant switching frequency of the control signal produced by the control unit, and when the DC output voltage level sufficient for the electric load is relatively low, the ON state and OFF state of the switching element is controlled in accordance with the control signal produced by the control unit, where the minimum ON-state duration setting unit adjusts the control signal to set the ON state duration of the switching element to a value corresponding to the minimum value determined by the minimum ON state duration setting unit.

18. A DC/DC converter that converts a DC input voltage to a DC output voltage and supplies the DC output voltage to a load, the DC/DC converter using both a pulse width modulation control technique and a constant ON-time control technique and comprising:

a switching element connected to the DC input voltage and selectively switchable to an ON state and an OFF state, the duration in which the switching element is in the ON state being an ON state duration of the switching element, the switching element being selectively switchable to determine an output voltage level of the DC output voltage to be sufficient for the load; and a mechanism for controlling the switching of the switching element according to the pulse width modulation control technique when the load is relatively high, and for controlling the ON state duration of the switching element according to the constant ON-time control technique when the load is relatively low.

* * * * *

UNITED STATES PATENT AND TRADEMARK OFFICE
CERTIFICATE OF CORRECTION

PATENT NO.    : 5,627,459
DATED         : May 6, 1997
INVENTOR(S)   : ITOYAMA et al.

It is certified that error appears in the above-indentified patent and that said Letters Patent is hereby corrected as shown below:

Col. 9,   line 31, change "OR" to --OR--.

Col. 17,  line 36 (Claim 9, line 27), change "ON" to --ON--.

Col. 18,  line 7 (Claim 13, line 1), change "10" to --9--.

Signed and Sealed this

Ninth Day of September, 1997

BRUCE LEHMAN

*Attest:*

*Attesting Officer*           *Commissioner of Patents and Trademarks*